United States Patent [19]

Chien

[11] Patent Number: 5,266,755
[45] Date of Patent: Nov. 30, 1993

[54] CAR SILENCER FOR ABSORBING SOUND AND EXHAUST POLLUTANTS

[76] Inventor: Kuo-Feng Chien, c/o Hung Hsing Patent Service Center P.O. Box 55-1670, Taipei (10477), Taiwan

[21] Appl. No.: 970,187

[22] Filed: Nov. 2, 1992

[51] Int. Cl.$^5$ .................................................. F01N 1/10
[52] U.S. Cl. ...................................... 181/252; 181/255; 181/256; 181/258; 181/267; 181/240; 181/243
[58] Field of Search ............... 181/227, 232, 240, 243, 181/252, 255, 256, 258, 264, 267, 269, 272, 282

[56] References Cited

U.S. PATENT DOCUMENTS

| 2,014,666 | 9/1935 | Peik | 181/258 |
| 4,372,421 | 1/1983 | Jackson | 181/243 |

Primary Examiner—Michael L. Gellner
Assistant Examiner—Khanh Dang

[57] ABSTRACT

A car silencer includes an outer pipe having a front expansion chamber defined in a front portion of the outer pipe connected with a connecting tube which is connected to an engine manifold for directing waste gas as discharged from a car engine, an inner pipe detachably inserted in a rear expansion chamber in the outer pipe at a rear portion of the front expansion chamber, an absorbing and filtering medium filled in the inner pipe, and a perforated tail pipe inserted in the absorbing and filtering medium, wherein an engine exhaust gas will be reduced its sound in the front and rear expansion chambers and a plurality of pollutants laden in the exhaust gas will be absorbed, filtered and removed in the absorbing and filtering medium for preventing air pollution caused by an engine waste gas.

3 Claims, 2 Drawing Sheets

CAR SILENCER FOR ABSORBING SOUND AND EXHAUST POLLUTANTS

BACKGROUND OF THE INVENTION

A conventional car silencer as shown in FIG. 1 includes: a connecting tube M connected to an engine exhaust manifold, an expansion pipe having expansion chamber C defined in the expansion pipe connected to the connecting tube M provided with several perforated partition plates P in the expansion chamber C for reducing sound waves from a car exhaust gas, and an exhaust pipe E connected to the expansion chamber C for discharging the waste gas from the car engine. However, such a conventional silencer does not provide any mechanism for absorbing or removing the pollutants laden in the exhaust gas, thereby causing serious air pollution problems to the environment.

SUMMARY OF THE INVENTION

The object of the present invention is to provide a car silencer including an outer pipe having a front expansion chamber defined in a front portion of the outer pipe connected with a connecting tube which is connected to an engine manifold for directing waste gas as discharged from a car engine, an inner pipe detachably inserted in a rear expansion chamber in the outer pipe at a rear portion of the front expansion chamber, an absorbing and filtering medium filled in the inner pipe, and a perforated tail pipe inserted in the absorbing and filtering medium, wherein an engine exhaust gas will be reduced its sound in the front and rear expansion chambers and a plurality of pollutants laden in the exhaust gas will be absorbed, filtered and removed in the absorbing and filtering medium for preventing air pollution caused by an engine waste gas.

DETAILED DESCRIPTION

Figure 1:
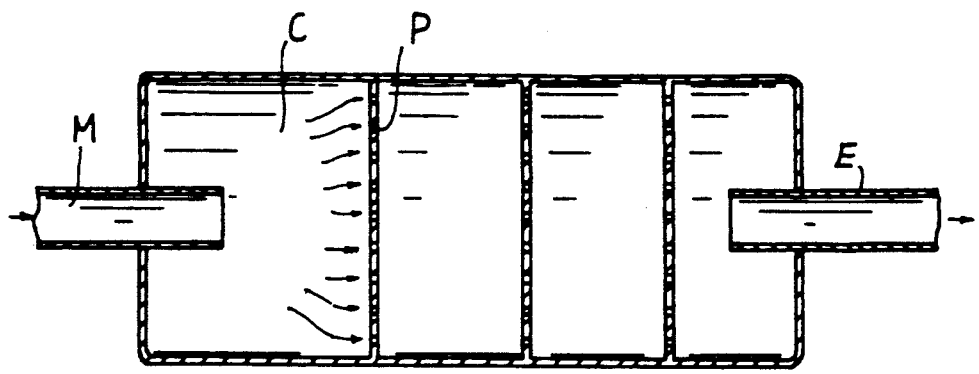
FIG. 1 is an illustration showing a conventional car silencer.
Figure 2:
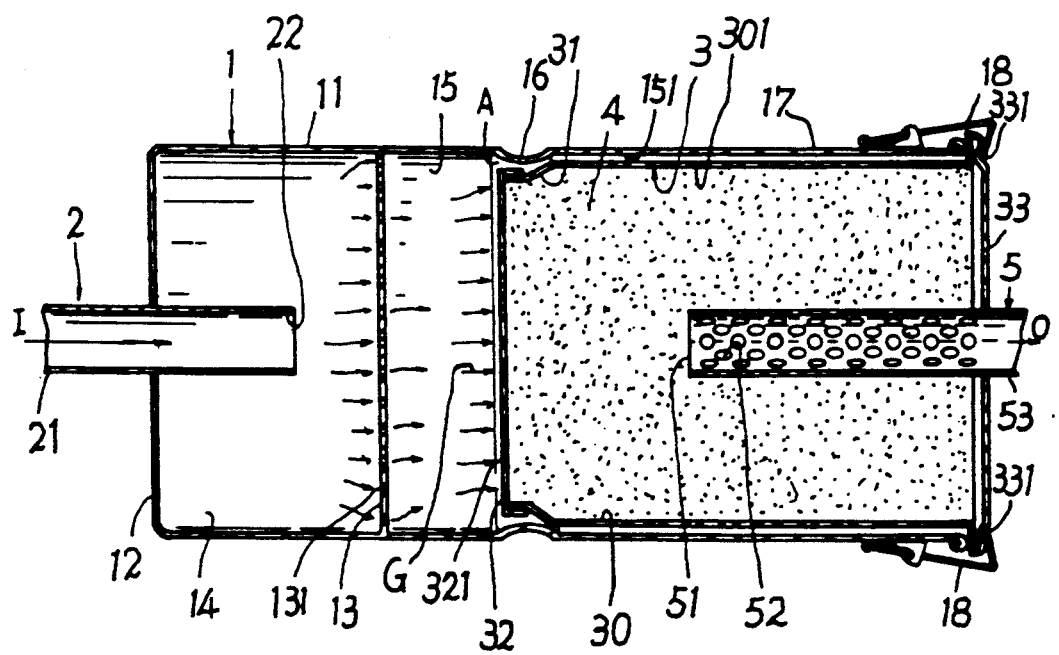
FIG. 2 is a sectional drawing of the present invention.
Figure 3:
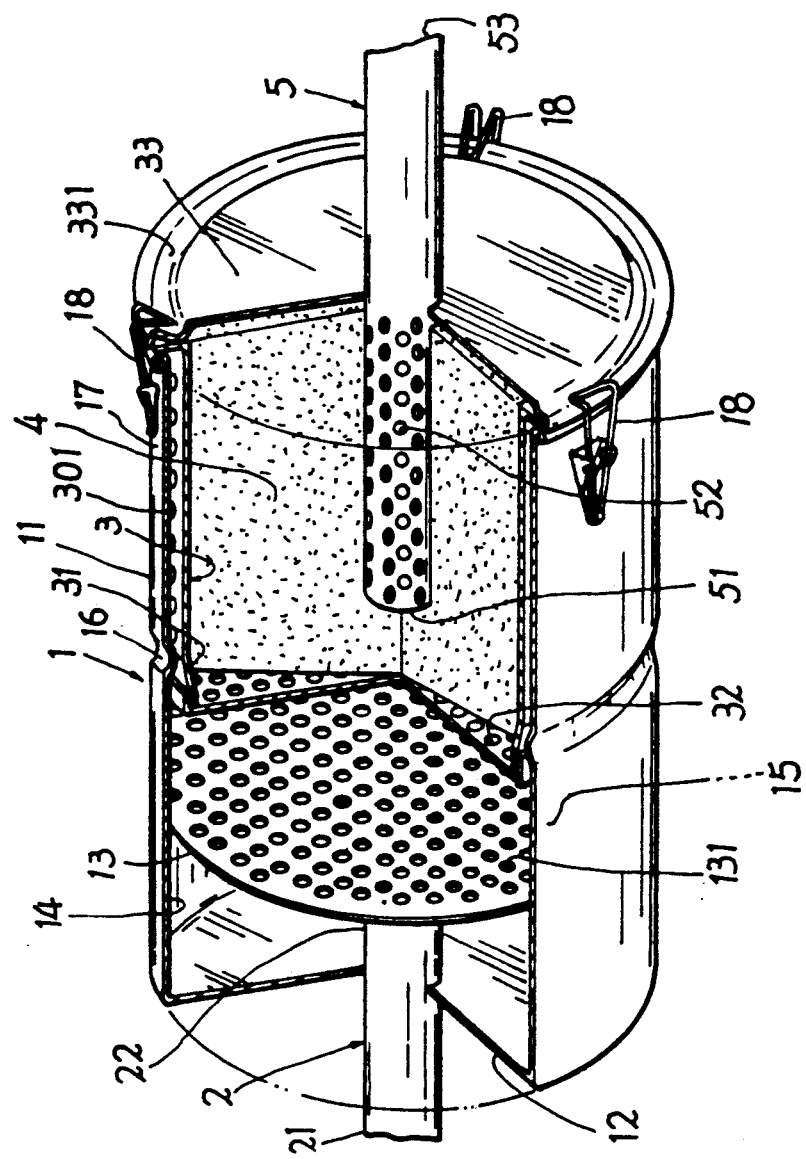
FIG. 3 is a partial cut-away illustration of the present invention.

As shown in FIGS. 2 and 3, the present invention comprises: an outer pipe 1, a connecting tube 2, an inner pipe 3, an absorbing and filtering medium 4, and a perforated tail tube 5.

The connecting tube 2 has its input tube end 21 connected to an engine exhaust system, such as an engine manifold for directing the combustion waste gas from an engine into the silencer of the present invention through an exhaust port 22 to be treated in the silencer for reducing its sound and removing the pollutants carried in the exhaust gas.

The outer pipe 1 includes: a cylindrical pipe section 11 having a front closed end plate 12 and a discharge port portion 17 respectively disposed on a front end and a rear end portion of the outer pipe 1, a perforated partition plate 13 having a plurality of perforations 131 formed in the partition plate 13 defining a front expansion chamber 14 between the perforated partition plate 13 and the front closed end plate 12 communicating the exhaust port 22 of the connecting tube, and a rear expansion chamber 15 formed in a rear portion of the cylindrical pipe section 11 defined between the perforated partition plate 13 and the discharge port portion 17 for detachably inserting the inner pipe 3 in the rear expansion chamber 15.

The inner pipe 3 includes: an inner cylindrical pipe section 30 having a plurality of perforations 301 formed in a circumferential surface of the inner cylindrical pipe section 30, a front perforated cover 32 formed on a front end portion of the inner pipe section 30 adjacent to the perforated partition plate 13 of the outer pipe 1 with a plurality of inlet holes 321 formed in the front perforated cover 32, and a rear closed cover 33 sealably formed on a rear end portion of the inner pipe section 30 for encasing an absorbing and filtering medium 4 in the inner cylindrical pipe section.

The outer pipe 1 is formed with an annular groove 16 annularly recessed in the cylindrical pipe section 11 adjacent to the perforated partition plate 13 of the outer pipe 1 engageable with a tapered front end portion 31 of the inner pipe 3, and the outer pipe 1 is formed with a plurality of fasteners 18 on a rear end portion of the outer pipe 1 operatively clipping a rim groove 331 annularly recessed in a rear closed cover 33 of the inner pipe 3 for firmly securing the inner pipe 3 in the outer pipe 1.

The absorbing and filtering medium 4 may be selected from absorptive and filtering materials, such as activated carbon, porous filtering material, etc., capable of absorbing sound waves of an exhaust waste gas emitted from a car engine and capable of filtering the pollutants laden in the exhaust waste gas.

The perforated tail tube 5 includes an inlet tube portion 51 having a plurality of discharge holes 52 formed in the inlet tube portion 51 inserted into the absorbing and filtering medium 4, and an outlet tube portion 53 adjacent to the inlet tube portion 51 and protruding rearwardly beyond a rear closed cover 33 of the inner pipe 3.

A length of the inlet tube portion 51 of the tail tube 5 is preferably not less than one half of a total length of the absorbing and filtering medium 4 filled in the inner pipe 3.

Since there may be possibly formed with an aperture A between the annular groove 16 of the outer pipe 1 and the tapered front end portion 31 of the inner pipe 3, the exhaust gas G may pass through the aperture A to enter an annular space 151 defined between the inner pipe 3 and the outer pipe 1 and then enter a plurality of perforations 301 formed in the inner cylindrical pipe section 30 to be filtered by the absorbing and filtering medium 4 in the inner pipe 3.

The present invention is superior to a conventional silencer because of its double duties both for reducing the sound of an engine waste gas and also for absorbing or filtering pollutants such as carbon, carbon monoxide, etc., laden in the exhaust gas for preventing noise and air pollutions.

I claim:

1. A car silencer comprising: an outer pipe having a front expansion chamber defined in a front portion of the outer pipe connected with a connecting tube which is connected to an engine manifold for directing waste gas as discharged from a car engine therein, an inner pipe detachably inserted in a rear expansion chamber defined in the outer pipe at a rear portion of the front expansion chamber, an absorbing and filtering medium filled in the inner pipe, and a perforated tail pipe inserted in the absorbing and filtering medium, wherein an engine exhaust gas is reduced its sound in the front and rear expansion chambers and a plurality of pollutants laden in the exhaust gas are absorbed, filtered and removed in the absorbing and filtering medium in the inner pipe;

said outer pipe including: a cylindrical pipe section having a front closed end plate and a discharge port portion respectively disposed on a front end and a rear end portion of the outer pipe, a perforated partition plate having a plurality of perforations formed in the partition plate defining the front expansion chamber between the perforated partition plate and the front closed end plate communicating an exhaust port of the connecting tube, and the rear expansion chamber formed in a rear portion of the cylindrical pipe section defined between the perforated partition plate and the discharge port portion for detachably inserting the inner pipe in the rear expansion chamber; said inner pipe including: an inner cylindrical pipe section having a plurality of perforations formed in a circumferential surface of the inner cylindrical pipe section, a front perforated cover formed on a front end portion of the inner pipe section adjacent to the perforated partition plate of the outer pipe with a plurality of inlet holes formed in the front perforated cover, and a rear closed cover sealably formed on a rear end portion of the inner pipe section for encasing an absorbing and filtering medium in the inner cylindrical pipe section of the inner pipe; and said outer pipe formed with an annular groove annularly recessed in the cylindrical pipe section of the outer pipe adjacent to the perforated partition plate of the outer pipe engageable with a tapered front end portion of the inner pipe, and the outer pipe formed with a plurality of fasteners on a rear end portion of the outer pipe operatively clipping a rim groove annularly recessed in a rear closed cover of the inner pipe for firmly securing the inner pipe in the outer pipe.

2. A car silencer according to claim 1, wherein said absorbing and filtering medium is made of absorptive and filtering materials, capable of absorbing sound waves of an exhaust waste gas emitted from a car engine and capable of filtering the pollutants laden in the exhaust waste gas.

3. A car silencer according to claim 1, wherein an aperture is formed between the annular groove of the outer pipe and the tapered front end portion of the inner pipe, so that an exhaust gas passes through the aperture to enter an annular space defined between the inner pipe and the outer pipe and then enter a plurality of perforations formed in the inner cylindrical pipe section to be filtered by an absorbing and filtering medium in the inner pipe.

* * * * *